(12) United States Patent
Kurohata et al.

(10) Patent No.: US 6,729,986 B2
(45) Date of Patent: May 4, 2004

(54) HYDRAULIC TYPE TENSIONER WITH RELIEF VALVE

(75) Inventors: Junya Kurohata, Osaka (JP); Hisashi Tomioka, Kouza-gun (JP); Kazuaki Kawamura, Kouza-gun (JP)

(73) Assignee: Tsubakimoto Chain Co., Osaka (JP)

( * ) Notice: Subject to any disclaimer, the term of this patent is extended or adjusted under 35 U.S.C. 154(b) by 85 days.

(21) Appl. No.: 10/136,546

(22) Filed: May 1, 2002

(65) Prior Publication Data

US 2002/0169042 A1 Nov. 14, 2002

(30) Foreign Application Priority Data

May 1, 2001 (JP) ......................... 2001-134479

(51) Int. Cl.$^7$ ................................. F16H 7/22
(52) U.S. Cl. ...................................... 474/110
(58) Field of Search ........................... 474/110

(56) References Cited

U.S. PATENT DOCUMENTS

| 4,874,352 A | | 10/1989 | Suzuki | |
| 5,310,385 A | * | 5/1994 | Suzuki | 474/110 |
| 5,352,159 A | * | 10/1994 | Suzuki et al. | 474/110 |
| 5,797,817 A | * | 8/1998 | Senftleben et al. | 474/110 |
| 6,196,939 B1 | * | 3/2001 | Simpson | 474/110 |

FOREIGN PATENT DOCUMENTS

| DE | 2008472 | 9/1971 |
| DE | 199 57 527 | 6/2000 |
| EP | 0 756 108 | 1/1997 |
| GB | 2 352 794 | 2/2001 |

* cited by examiner

Primary Examiner—Thomas R. Hannon
(74) Attorney, Agent, or Firm—Dann, Dorfman, Herrell and Skillman; Henry H. Skillman

(57) ABSTRACT

The present invention relates to a hydraulic type tensioner with a relief valve. In this tensioner, a relief valve, which is opened and closed in accordance with the oil pressure of oil supplied under pressure from an oil pressure generating source such as an oil pump or the like through an oil supply port, is provided in a bypass oil path, which detours a check valve mechanism formed in a tensioner body and communicates between the oil supply port and a high pressure oil chamber.

4 Claims, 4 Drawing Sheets

US 6,729,986 B2

HYDRAULIC TYPE TENSIONER WITH RELIEF VALVE

FIELD OF THE INVENTION

The present invention relates to a hydraulic type tensioner with a relief valve, which is used for applying proper tension to a timing chain or the like in a vehicle engine.

BACKGROUND OF THE INVENTION

Hydraulic type tensioners, which are used for applying proper tension to a timing chain or the like in a vehicle engine, include, as shown by a timing transmission in FIG. 4, a hydraulic type tensioner with a relief valve 50. The relief valve adjusts chain tension through a tensioner lever TL for relieving excess tension when the excess tension is generated in a timing chain TC, which is stretched and transmitted between a drive shaft side sprocket S1 and a driven shaft side sprocket S2.

FIG. 5 is a front cross-sectional view showing one example of a conventional hydraulic type tensioner with a relief valve. The conventional hydraulic type tensioner with a relief valve 50 shown in FIG. 5 comprises a housing 51, a plunger 52 slidably fit into a plunger-accommodating hole 51a with a bottom formed in the housing 51, a spring 53, which biases in a direction where the plunger 52 is projected, a high pressure oil chamber 54 formed between the housing 51 and the plunger 52, a check valve mechanism 55 provided on a bottom portion of the plunger-accommodating hole 51a formed in the housing 51, and a relief valve 56 provided in the housing 51 outside the check valve mechanism 55 in the radial direction thereof.

The check valve mechanism 55 comprises a ball seat 55b having an oil path 55a press-fit into a hole 51b formed at a bottom portion of the plunger-accommodating hole 51a, a check ball 55c, which can be abutted on this ball seat 55b, a retainer 55d, which holds this check ball 55c, and a spring 55e, which biases the check ball 55c toward the ball seat 55b. The hole 51b formed in the housing 51 has an oil supply port (not shown) for supplying oil from an oil pressure generating source such as an oil pump or the like to a high pressure oil chamber 54 and a supply oil path, which flows through this oil supply port. This check valve mechanism 55 has the dual functions of permitting the flowing of oil into the high pressure oil chamber 54 and on the contrary blocking the flowing of oil out of the high pressure oil chamber 54.

The relief valve 56 comprises a valve body fitting hole 56a formed in the housing 51, a communicating hole 56b, which communicates between the high pressure oil chamber 54 and the valve body fitting hole 56a, a valve body 56c slidably fit into the valve body fitting hole 56a, a spring 56d, which biases the valve body 56c, a relief hole 56e, which communicates between the valve body fitting hole 56a formed in the housing 51 and the outside thereof, and a plug 56f press-fit into the valve body fitting hole 56a from the outside. The relief valve 56 has the function that when the oil pressure in the high pressure oil chamber 54 exceeds a predetermined pressure, the valve body 56c is moved backward against a bias force of the spring 56d and the communicating hole 56b communicates with the relief hole 56e thereby to reduce the oil pressure in the high pressure chamber 54.

In this hydraulic type tensioner with the relief valve 50, in a state where an engine is in a predetermined usual drive, when slackening of the timing chain occurs, the plunger 52 is projected by the bias force of the spring 53 and at the same time the check ball 55c is separated from the ball seat 55b so that oil is supplied from an oil pressure generating source such as an oil pump (not shown) or the like formed in the housing 51 through the supply hole 51b into the high pressure oil chamber 54, and through the oil path 55a in the ball seat 55b thereby to maintain the tension of the timing chain.

Further, in this hydraulic type tensioner with the relief valve 50, when excessive tension is generated in the chain, the plunger 52 receives a thrust load from a tensioner lever TL in a direction opposite to the bias direction. Then the check valve mechanism 55 acts so as to prevent the backflow of oil in the high pressure oil chamber 54, and oil in the high pressure oil chamber 54, which is non-compressible fluid, prevents the return of the plunger 52. However, the valve body 56c of the relief valve 56 receives an oil pressure generated in the high pressure oil chamber 54 and is slid against the bias force of the spring 56d to be slightly moved backward, whereby excessive tension generated in the timing chain is absorbed.

Further, when the thrust load to the plunger 52 is increased and the valve body 56c of the relief valve 56 is further backed, the communicating hole 56b communicates with the relief hole 56e, so that a discharge of oil in the high pressure oil chamber 54 to the outside of the tensioner 50 is permitted. Thus, the oil pressure in the high pressure oil chamber 54 is decreased and excessive tension of the timing chain is absorbed.

Then, if the oil pressure in the high pressure oil chamber 54 is decreased with the discharge of oil outside the tensioner, the valve body 56c receives the bias force of the spring 56d and closes the relief hole 56e to maintain the oil pressure in the high pressure oil chamber 54 to a preset value. In this case, if the oil pressure in the high pressure oil chamber 54 is excessively decreased, the check valve mechanism 55 acts so that oil flows into the high pressure oil chamber 54 to return the oil pressure in the high pressure oil chamber 54 to a normal level.

However, in the above-mentioned conventional hydraulic type tensioner with the relief valve 50 shown in FIG. 5, when excessive tension has been generated in the timing chain, oil in the high pressure oil chamber 54 is discharged outside the tensioner through the relief valve 56 in a larger amount than is necessary so that the oil pressure in the high pressure oil chamber 54 is excessively decreased further than a preset value. Therefore, it has been found that proper tension cannot be applied to the timing chain till the valve mechanism 55 acts to cause oil to flow into the high pressure oil chamber 54, thereby to return the oil pressure therein to a preset value.

Further, in such a conventional hydraulic type tensioner with a relief valve 50, when the oil supplied from an oil pressure generating source such as an oil pump or the like has reached excessively high pressure or when the resonance phenomenon due to high frequency vibration of the whole apparatus, the oil supplied from the oil pressure generating source such as an oil pump or the like is one-sidedly supplied under pressure to the high pressure oil chamber 54 through the check valve mechanism 55 and the pressure of the supplied oil in the high pressure oil chamber 54 aids the bias force of the spring 56d so that the spring 56d further tensions the timing chain more than is necessary. Accordingly, there are problems that the vibration noise during traveling of chain is increased and the timing chain is broken in an early stage.

Further, in the conventional hydraulic type tensioner with a relief valve 50, oil is supplied from an oil pressure generating source such as an oil pump or the like by the activation of an engine. Thus, when smooth supply of oil from the oil pressure generating source such as an oil pump or the like is not obtained at the starting of an engine or the like and the supplied oil pressure is low, the oil pressure in the high pressure oil chamber 54 does not reach a preset pressure, whereby the bias force due to the oil pressure in the high pressure oil chamber 54 is insufficient. As a result, tension must be applied to a traveling timing chain at the starting of transmission by the movement of the plunger 52 according to only the bias force of the spring 56d and there is a problem that proper tension of a chain cannot be obtained.

SUMMARY OF THE INVENTION

It is, accordingly, a general object of the present invention to overcome the problems associated with the above-mentioned conventional hydraulic type tensioner.

A more specific object of the present invention is to provide a hydraulic type tensioner with a relief valve, which permits smooth traveling of a timing chain by causing the oil in the high pressure oil chamber to flow into a tensioner without discharging the oil outside the tensioner to rapidly recover proper tension of the chain when excessive tension has been generated in the timing chain or when the inside of the high pressure oil chamber is likely to reach excessively high pressure due to excessive supply of oil through an oil pressure generating source such as an oil pump or the like or due to occurrence of the resonance phenomenon by high frequency vibration of the whole apparatus.

Additionally, another object of the present invention is to provide a hydraulic type tensioner with a relief valve, which permits a quick response to changes in the tension of the chain by maintaining the oil pressure in the high pressure oil chamber to a preset pressure even if smooth supply of oil is not obtained from an oil pressure generating source such as an oil pump or the like and the pressure of supplied oil is low at the starting of engine.

According to one aspect of the present invention, there is provided a hydraulic type tensioner with a relief valve comprising: a plunger, which is spring-biased to be projected toward a traveling timing chain, a tensioner body having a plunger accommodating hole, into which said plunger is fit and inserted movably outward and inward, and an oil supply port which supplies oil under pressure from an oil pressure generating source such as an oil pump or the like, a check valve mechanism, which causes the oil supplied under pressure through said oil supply port to flow into a high pressure oil chamber formed between said plunger accommodating hole and said plunger and which blocks the backflow of the oil, wherein a relief valve, which is opened or closed in accordance with the oil pressure of oil supplied under pressure through said oil supply port, is provided in a bypass oil path formed in said tensioner body, which bypasses said check valve mechanism and communicates between said oil supply port and said high pressure oil chamber.

It should be noted that the relief valve, which is opened or closed in accordance with the oil pressure of oil supplied under pressure through said oil supply port in the present invention is a safety valve, which becomes a closed state when the oil pressure of oil supplied under pressure through the oil supply port is a preset value or less at which proper tension of a chain can be maintained, or which achieves an opened state when the oil pressure of oil supplied under pressure through the oil supply port exceeds a preset value at which proper tension of a chain can be maintained, so that the oil pressure is abnormally increased. The relief valve is opened when there is at least a larger oil pressure than in the check valve mechanism used in the present invention.

According to the present invention, since a bypass oil path formed in the tensioner body, which bypasses the check valve mechanism and communicates between the oil supply port and the high pressure oil chamber, is provided with a relief valve, which is opened or closed in accordance with the oil pressure of oil supplied under pressure through said oil supply port, when the inside of the high pressure oil chamber is likely to reach excessive high pressure due to excessive supply of oil through an oil pressure generating source such as an oil pump or the like or due to occurrence of the resonance phenomenon by high frequency vibration of the whole apparatus, the relief valve in the bypass oil path formed in the tensioner body is opened. Accordingly, high pressure oil supplied from the oil pressure generating source flows into the high pressure oil chamber from the bypass oil path without passing through the check valve mechanism so that the oil pressure of oil supplied from the oil pressure generating source is distributed and decreased. Thus, excessive supply of oil to the high pressure chamber can be prevented.

Further, when excessive tension is generated in the timing chain, the check valve mechanism achieves a closed state in synchronization with the plunger pressed back by this excessive tension and the oil pressure of oil supplied from the oil pressure generating source rapidly reaches high pressure state so that the relief valve in the bypass oil path is opened. Accordingly, oil in the high pressure oil chamber is returned back to the oil supply side through the bypass oil path and the oil pressure within the high pressure oil chamber can be decreased without causing the oil pressure to be reduced excessively lower than a preset value. As a result the excessive tension generated in the timing chain can be reliably absorbed.

According to the present invention, it is preferable that between said oil supply port and the check valve mechanism is provided an oil reservoir section that stores oil supplied under pressure through the oil supply port.

According to the present invention, the oil reservoir section that stores oil supplied under pressure through the oil supply port is provided between the oil supply port and the check valve mechanism. Thus, even if smooth supply of oil from the oil pressure generating source such as an oil pump or the like is not obtained and the pressure in supplied oil is low at the starting of engine, oil previously stored in the oil reservoir section flows into the high pressure oil chamber. As a result proper tension can be quickly obtained at the starting of engine or the like.

BRIEF DESCRIPTION OF THE DRAWINGS

Preferred Embodiments of the present invention will now be described in detail with reference to the accompanying drawings, in which.

DETAILED DESCRIPTION OF THE PREFERRED EMBODIMENTS

Figure 1:
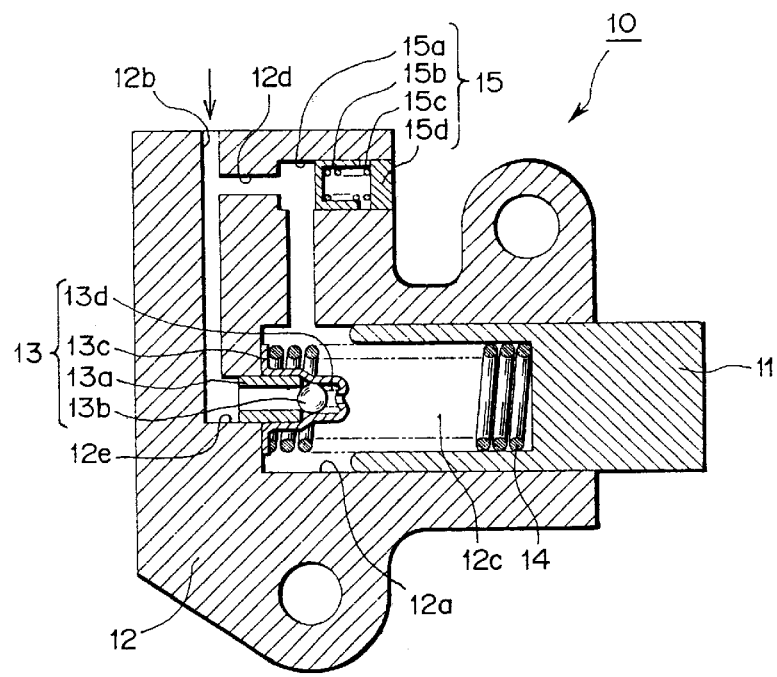
FIG. 1 is a front cross-sectional view of a hydraulic tensioner with a relief valve of a first Embodiment according to the present invention.

First, the present invention will be described below based on a first Embodiment with reference to FIG. 1. FIG. 1 is a front cross-sectional view of a hydraulic type tensioner with a relief valve of the first Embodiment according to the present invention.

A hydraulic type tensioner with a relief valve 10 shown in FIG. 1 comprises: a plunger 11, which is projected toward a traveling timing chain, a tensioner body 12 in which a plunger accommodating hole 12a with a bottom, into which the plunger 11 is fit and inserted movably outward and inward and an oil supply port 12b which supplies oil under pressure from an oil pressure generating source such as an oil pump or the like were formed, a check valve mechanism 13, which causes the oil supplied under pressure through the oil supply port 12b to flow into a high pressure oil chamber 12c formed between the plunger accommodating hole 12a and the plunger 11 and blocks the backflow of the oil, and a pressing spring 14, which spring-biases to project the plunger 11 toward a traveling timing chain.

Then, a bypass oil path 12d, which bypasses the check valve mechanism 13 and communicates between the oil supply port 12b and the high pressure oil chamber 12c, is formed in this tensioner body 12. Further, in this bypass oil path 12d is provided a relief valve 15, which is opened or closed in accordance with the oil pressure of oil supplied under pressure through the oil supply port 12b.

The check valve mechanism 13 comprises a ball seat 13a press-fit into a supply oil path 12e formed in the tensioner body 12, a check ball 13b, which can be brought into contact with this ball seat 13a, a retainer 13c for holding this check ball 13b, and a spring 13d for the ball, which biases the check ball 13b toward the ball seat 13a. The check valve mechanism 13 has the dual function of allowing the flow of oil into the high pressure oil chamber 12c, and on the contrary blocking the backflow of oil from the high pressure oil chamber 12c.

The above-mentioned relief valve 15 is provided in the bypass oil path 12d, which detours the check valve mechanism 13 and communicates between the oil supply port 12b and the high pressure oil chamber 12c. The relief valve 15 comprises a valve body fitting hole 15a formed by enlarging a part of this bypass oil path 12d, a cap-shaped valve body 15b slidably fit into this valve body fitting hole 15a, a spring 15c for the valve body, which biases the valve body 15b, and a sealing plug 15d press-fit into the valve fitting hole 15 from outside and supporting the spring 15c for the valve body. Further, the relief valve 15 has the function of a safety valve in which when the oil pressure of oil supplied under pressure through the oil supply port 12b exceeds a preset pressure, the valve body 15 is moved backward against a bias force of the spring 15c for the valve body and the relief valve is opened, so that the oil supplied under pressure through the oil supply port 12b flows into the high pressure oil chamber 12c through the bypass oil path 12d.

It should be noted that the spring 15c for the valve body in the relief valve 15 has such elastic modulus that when the oil pressure of oil supplied under pressure through the oil supply port 12b is below a preset pressure at which proper tension of the chain can be maintained, the relief valve 15 achieves a closed state (not shown) against the port 12b, and when the oil pressure of oil supplied under pressure through the oil supply port 12b is at least larger oil pressure than the check valve mechanism 13 the relief valve 15 achieves an opened state.

In such hydraulic type tensioner with the relief valve 10 of the first Embodiment, when loosening of the timing chain occurs in an engine-driven state, the plunger 11 is projected by a bias force of the pressing spring 14 and at the same time the check ball 13b is separated from the ball seat 13a.

Accordingly, oil supplied from the oil pressure generating source such as an oil pump or the like is supplied into the high pressure oil chamber 12c from the supply oil path 12e through the check valve mechanism 13 so that the tension of the timing chain is maintained.

When the inside of the high pressure oil chamber 12c is likely to reach excessive high pressure due to excessive supply of oil supplied from the oil pressure generating source such as an oil pump or the like or due to occurrence of the resonance phenomenon by high frequency vibration of the whole apparatus, the valve body 15b of the relief valve 15 formed in the bypass oil path 12d is relieved by the excessive oil pressure of oil supplied from the oil pressure generating source, so that high pressure oil supplied therefrom flows into the high pressure oil chamber 12c through the bypass oil path 12d without passing through the check valve mechanism 13. Accordingly, the oil pressure of the oil supplied from the oil pressure generating source is distributed and lowered and the excessive supply of oil from the supply oil path 12e to the high pressure oil chamber 12c through the check valve mechanism 13 can be suppressed. As a result the oil pressure in the high pressure oil chamber 12c is returned to a normal pressure.

Further, when excessive tension is generated in the timing chain, the check valve mechanism 13 achieves a closed state in synchronization with the plunger 11 pushed back by this excessive tension and the oil pressure of oil supplied from the oil pressure generating source quickly reach a high pressure state, so that the valve body 15b of the relief valve 15 formed in the bypass oil path 12d is relieved. Thus, the oil in the high pressure oil chamber 12c is returned back to the oil supply side through the bypass oil path 12d to distribute and lower the oil pressure in the high pressure oil chamber 12c without excessively lowering the oil pressure than a preset value. As a result the excessive tension generated in the timing chain can be reliably absorbed.

Therefore, when excessive tension has been generated in the timing chain or when the inside of the high pressure oil chamber 12c is likely to reach excessive high pressure due to excessive supply of the oil supplied from the oil pressure generating source such as an oil pump or the like or due to occurrence of the resonance phenomenon by high frequency vibration of the whole apparatus, the above-mentioned hydraulic type tensioner with the relief valve 10 of the first Embodiment permits flow-absorbing of the oil in the high pressure oil chamber 12c within the tensioner without discharging the oil outside the tensioner. Thus, proper tension can quickly be recovered and smooth traveling of the timing chain can be achieved.

Figure 2:
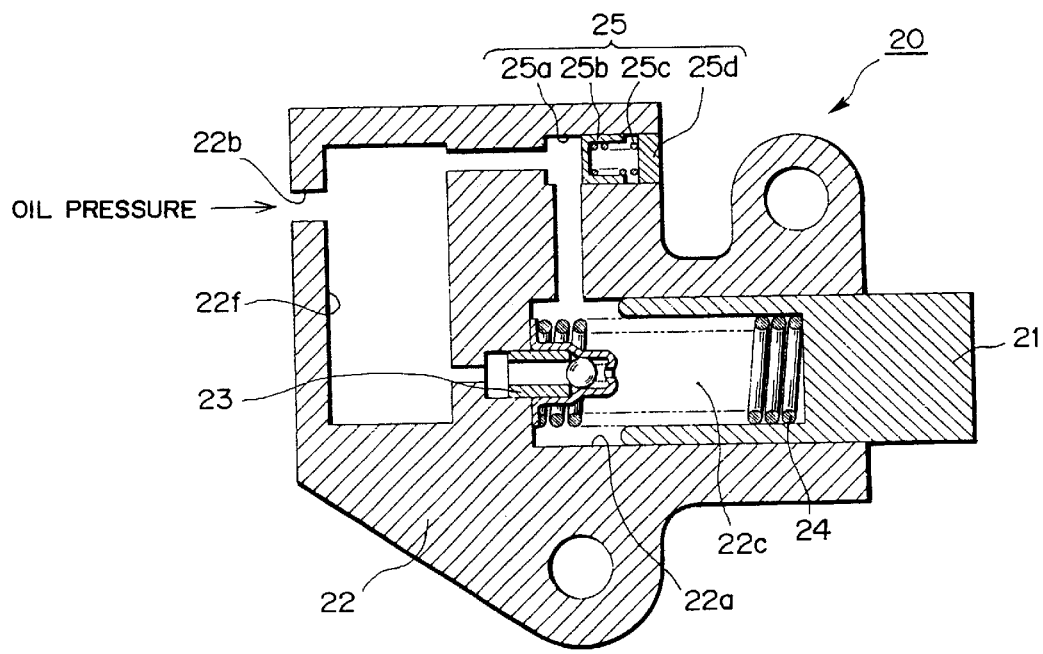
FIG. 2 is a front cross-sectional view of a hydraulic type tensioner with a relief valve of a second Embodiment according to the present invention.

Second, the present invention will be described below based on a second Embodiment with reference to FIG. 2. FIG. 2 is a front cross-sectional view of a hydraulic type tensioner with a relief valve 20 of the second Embodiment according to the present invention.

The hydraulic type tensioner with a relief valve 20 of the second Embodiment as shown in FIG. 2 has essentially the same tensioner structure as that of the above-described hydraulic type tensioner with a relief valve 10. The hydraulic type tensioner with a relief valve 20 includes, in addition to the essential structure, an oil reservoir section 22f, which stores oil supplied under pressure through the oil supply port 22b, between the oil supply port 22b and the check valve mechanism 23. In this connection, the respective reference numerals and symbols in FIG. 2 are denoted as the same as in the hydraulic type tensioner with the relief valve 10 of the first Embodiment in accordance with the members having the same structure, action and effect, and the explanation thereof will be omitted.

Thus, even if smooth supply of oil from the oil pressure generating source such as an oil pump or the like is not obtained and the pressure in supplied oil is low at the starting of an engine, since the oil previously stored in the oil reservoir section 22f flows into the high pressure oil chamber 22c, such hydraulic type tensioner with the relief valve 20 of the second Embodiment is capable of quickly obtaining proper tension of the chain at the starting of the engine.

Figure 3:
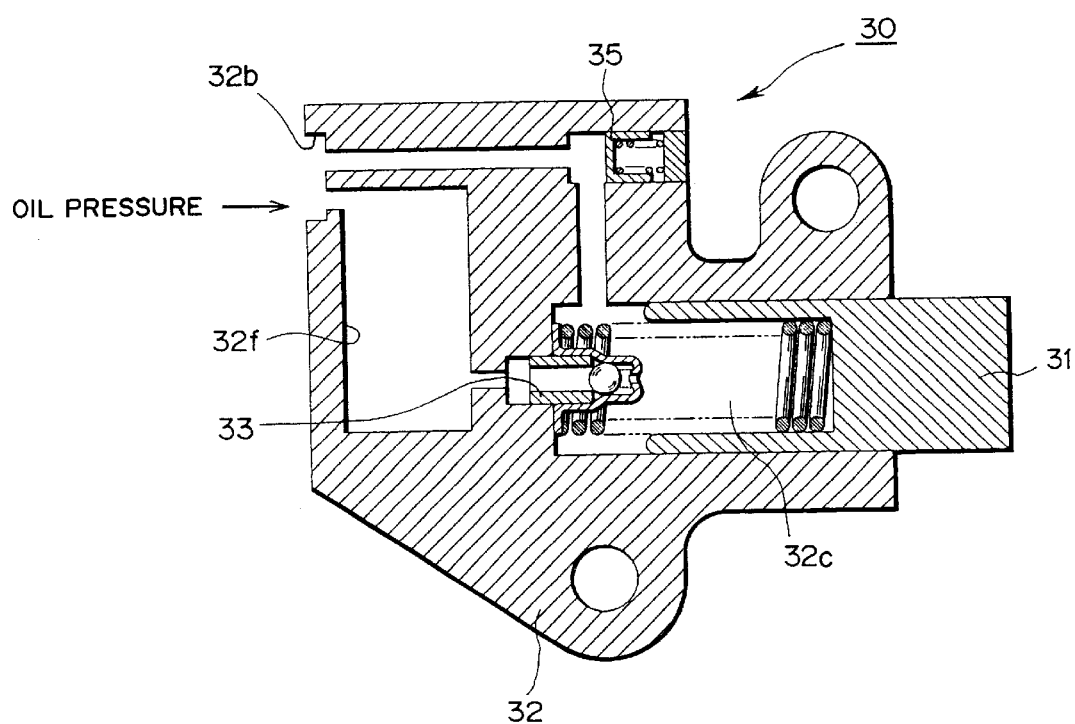
FIG. 3 is a front cross-sectional view showing a modified example of the hydraulic tensioner with the relief valve of the second Embodiment according to the present invention.
Figure 4:
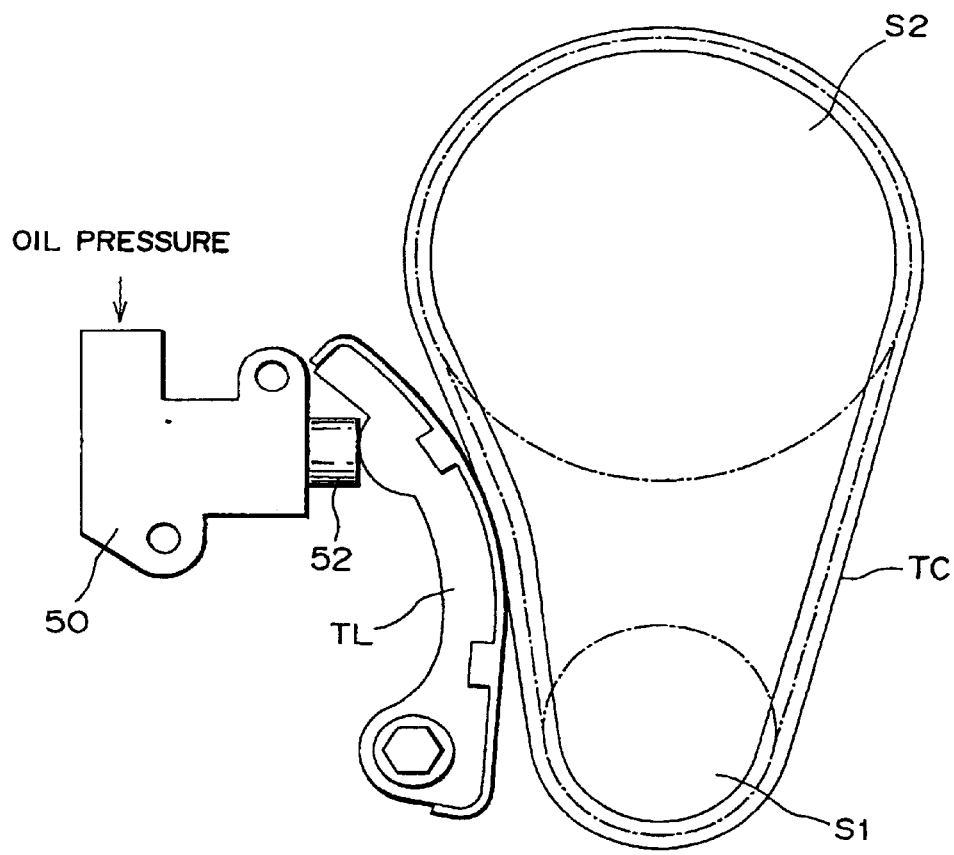
FIG. 4 is a schematic view of a timing transmission.
Figure 5:
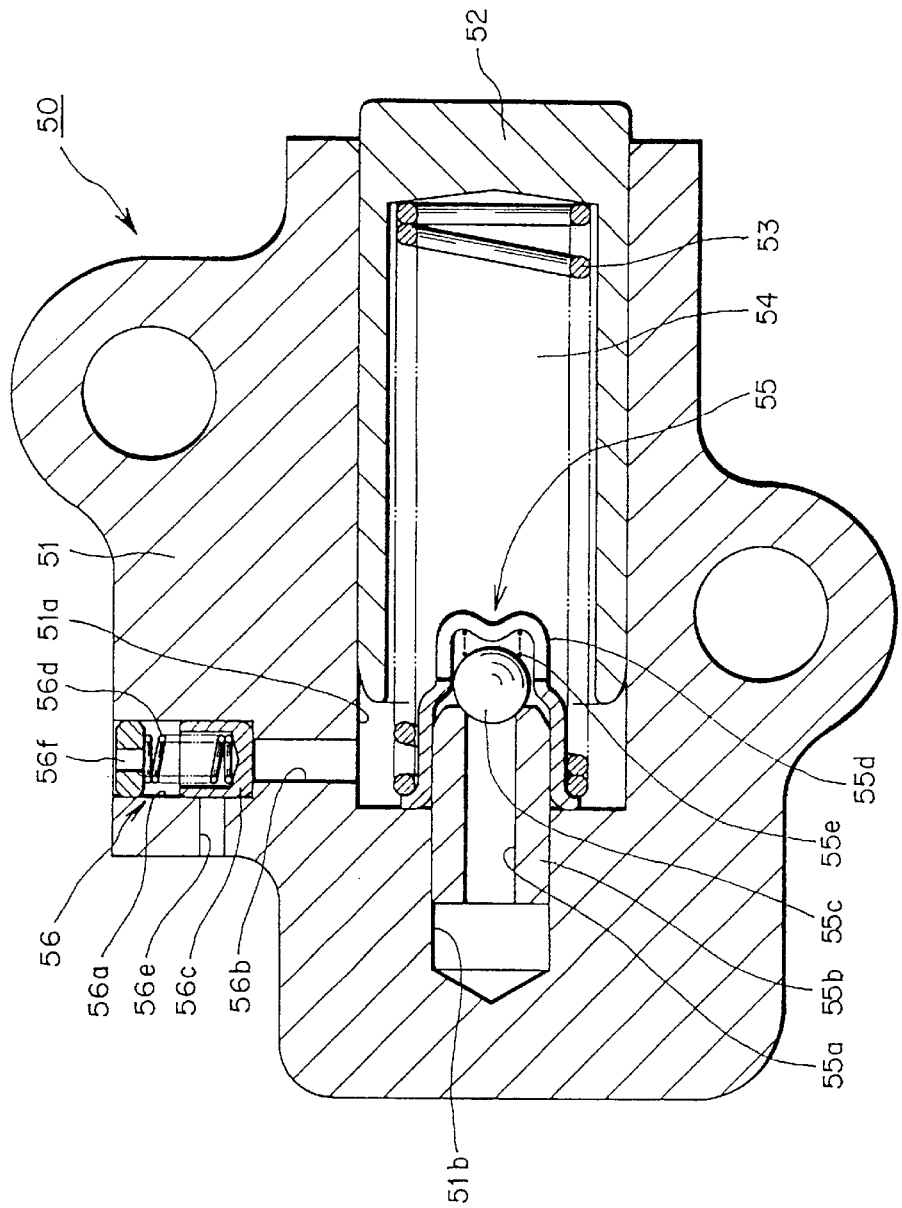
FIG. 5 is a front cross-sectional view showing a conventional hydraulic type tensioner with a relief valve.

FIG. 3 is a front cross-sectional view showing a modified example of the hydraulic type tensioner with the relief valve 20 of the second Embodiment according to the present invention. A hydraulic type tensioner with the relief valve 30 shown in FIG. 3 is an alternative where the shape of the oil reservoir section in the hydraulic type tensioner with the relief valve 20 was changed. Then, since the oil previously stored in an oil reservoir section 32f flows into a high pressure oil chamber 32c, the hydraulic type tensioner 30 with the relief valve 35 is capable of quickly obtaining proper tension of the chain at the starting of the engine. Thus, the tensioner shown in FIG. 3 is not so different from the second Embodiment in the action and effect.

Obviously, various minor changes and modifications of the present invention are possible in the light of the above teaching. It is therefore to be understood that within the scope of the appended claims, the present invention may be practiced otherwise than as specifically described.

What is claimed is:

1. For a traveling timing chain, a hydraulic type tensioner with a relief valve comprising: a plunger, which is spring-biased to be projected toward the traveling timing chain, a tensioner body having a plunger accommodating hole, into which said plunger is fit and inserted for movement outward and inward, a high pressure oil chamber formed between said plunger accommodating hole and said plunger, and an oil supply port which conneced to an oil pressure generating source, a check valve mechanism between said port and said chamber, which causes oil supplied through said oil supply port to flow into said high pressure oil chamber and blocks the backflow of the oil, a bypass oil path in said tensioner body, which detours said check valve mechanism and communicates between said oil supply port and said high pressure oil chamber, a relief valve operable to be opened or closed in accordance with the oil pressure of oil supplied through said oil supply port, in said bypass oil path formed in said tensioner body, said relief valve operable to detour said check valve mechanism and provide fluid communication between said oil supply port and said high pressure oil chamber when said oil pressure is above a set value, and to close said fluid communication when said oil pressure is below said set value.

2. The hydraulic type tensioner with the relief valve according to claim 1, including an oil reservoir section between said oil supply port and said check valve mechanism, said reservoir operable to store oil supplied through said oil supply port.

3. The hydraulic type tensioner with the relief valve according to claim 2 wherein said bypass oil path includes said oil reservoir section.

4. The hydraulic type tensioner with the relief valve according to claim 2 wherein said bypass oil path is connected directly to said oil supply port, and said oil reservoir section is positioned between said oil supply port end said check valve independently of said bypass oil path.

* * * * *

UNITED STATES PATENT AND TRADEMARK OFFICE
CERTIFICATE OF CORRECTION

PATENT NO. : 6,729,986 B2
DATED : May 4, 2004
INVENTOR(S) : Kurohata et al.

It is certified that error appears in the above-identified patent and that said Letters Patent is hereby corrected as shown below:

Column 8,
Line 9, "conneced" should be -- connected --;
Line 37, "end" should be -- and --.

Signed and Sealed this

Twenty-seventh Day of July, 2004

JON W. DUDAS
*Acting Director of the United States Patent and Trademark Office*